(12) United States Patent
Walsh et al.

(10) Patent No.: US 7,018,127 B2
(45) Date of Patent: Mar. 28, 2006

(54) CONNECTOR FOR JOINING TWO LENGTHS OF SHEET METAL DUCTING TOGETHER END-TO-END AND THE TWO PIECES OF SHEET METAL

(76) Inventors: Timothy E. Walsh, 307 E. Old Country Rd., Hicksville, NY (US) 11801;
Thomas M. Howard, 288 N. Monroe Ave., Lindenhurst, NY (US) 11758

( * ) Notice: Subject to any disclaimer, the term of this patent is extended or adjusted under 35 U.S.C. 154(b) by 90 days.

(21) Appl. No.: 10/864,038

(22) Filed: Jun. 9, 2004

(65) Prior Publication Data

US 2004/0218975 A1    Nov. 4, 2004

Related U.S. Application Data

(63) Continuation-in-part of application No. 10/013,121, filed on Dec. 7, 2001, now abandoned.

(51) Int. Cl.
*F16B 7/00* (2006.01)
(52) U.S. Cl. .................. 403/294; 403/292; 285/424
(58) Field of Classification Search ............... 403/206, 403/209, 222, 292, 297, 315, 319; 285/424, 285/405
See application file for complete search history.

(56) References Cited

U.S. PATENT DOCUMENTS

| | | | | | |
|---|---|---|---|---|---|
| 1,935,690 | A | * | 11/1933 | Zack ......................... | 285/331 |
| 2,039,886 | A | * | 5/1936 | Cohn ......................... | 285/330 |
| 2,275,572 | A | * | 3/1942 | Somers ..................... | 285/125.1 |
| 2,498,753 | A | * | 2/1950 | Deitsch ..................... | 285/64 |
| 2,752,950 | A | * | 7/1956 | Coulters ..................... | 285/406 |
| 2,965,397 | A | * | 12/1960 | Vanden Berg .............. | 285/189 |
| 3,479,073 | A | * | 11/1969 | Collins ....................... | 285/424 |
| 3,836,181 | A | * | 9/1974 | Kelver ....................... | 285/55 |
| 4,009,894 | A | * | 3/1977 | Marquette et al. .......... | 285/183 |
| 4,252,350 | A | * | 2/1981 | Smitka ....................... | 285/363 |
| 4,564,227 | A | * | 1/1986 | Murck ....................... | 285/364 |
| 4,566,724 | A | * | 1/1986 | Arnoldt et al. ............. | 285/364 |
| 4,881,762 | A | * | 11/1989 | Arnoldt ..................... | 285/367 |
| 5,103,872 | A | * | 4/1992 | Jyh-Long ................... | 138/158 |
| 5,195,789 | A | * | 3/1993 | Walsh et al. ................ | 285/331 |
| 6,203,074 | B1 | * | 3/2001 | Daniel ....................... | 285/424 |
| 6,213,522 | B1 | * | 4/2001 | Jacobson et al. ............ | 285/64 |

FOREIGN PATENT DOCUMENTS

| | | | | |
|---|---|---|---|---|
| EP | 0 298 912 A1 | * | 6/1988 | ................. 285/405 |
| WO | WO89/10512 | * | 4/1989 | ................. 285/405 |

\* cited by examiner

*Primary Examiner*—Robert J. Sandy
*Assistant Examiner*—Ruth C. Rodriguez
(74) *Attorney, Agent, or Firm*—Charles E. Baxley

(57) ABSTRACT

A connector for joining two pieces of sheet metal together end-to-end. A second wall and a first wall define a first channel therebetween, into which a ledge extends, and which lockingly receives one piece of sheet metal, by virtue of at least one reverse button lock on a raw free end of the one piece of sheet metal snapingly engaging against the ledge. A third wall terminates in a free edge that is folded onto itself, and together with the first wall, defines a second channel therebetween that lockingly receives the other piece of sheet metal, by virtue of at least one reverse button lock on a raw free end of the other piece of sheet metal snapingly engaging against the folded free edge of the third wall.

21 Claims, 3 Drawing Sheets

CONNECTOR FOR JOINING TWO LENGTHS OF SHEET METAL DUCTING TOGETHER END-TO-END AND THE TWO PIECES OF SHEET METAL

CROSS REFERENCE TO RELATED APPLICATION

The instant application is a Continuation-In-Part application of application Ser. No. 10/013,121, filed on Dec. 7, 2001 now abandoned, by Timothy E. Walsh and Thomas M. Howard, entitled CONNECTER FOR JOINING TWO PIECES OF SHEET METAL TOGETHER END-TO-END AND THE TWO PIECES OF SHEET METAL, and which is to be expressly abandoned when the instant application is accorded a filing date.

BACKGROUND OF THE INVENTION

1. Field of the Invention

The present invention relates to the class of duct and pipe joints or couplings. More particularly, the present invention relates to the subclass of particular interfaces originally in sheet form.

2. Description of the Prior Art

Heretofore it has been conventional to employ duct connectors, which used screws, bolts, clips, drives, and other external hardware to connect ducts end-to-end. The prior art connectors also required use of welding and metal working tools of various kinds.

These prior art techniques made installation of rectangular air conditioning ducts slow and laborious. Furthermore, in service, these connectors permitted leakage of conditioned air under pressure from air conditioning systems.

Thus, there exits a need for a duct connector that makes installation of rectangular air conditioning ducts fast and not laborious and which does not permit leakage of conditioned air under pressure from air conditioning systems.

Numerous innovations for duct work connectors have been provided in the prior art. Even though these innovations may be suitable for specific purposes which they address, they each differ in structure operation and/or purpose from the present invention.

FOR EXAMPLE, U.S. Pat. No. 1,935,690 to Zack teaches a joint for metal duct sections comprising a sheet metal body folded to form three folds between two of which one end of a duct section is insertable and between the next two of which the end of the adjoining duct section is inserted. Projections on the two duct sections, and detachable means engaging the projections hold the duct section ends locked between the respective pairs of folds.

ANOTHER EXAMPLE, U.S. Pat. No. 2,275,572 to Somers teaches a sheet metal duct of the type having a plurality of tubular sections and means for connecting the ends of the sections. The means for connecting the ends of the sections comprises a coupling formed of a plurality of bars, each of which has a longitudinally extending groove in each side edge. Cooperative means are provided on the bars for detachably connecting the ends thereof to form an endless collar. Inwardly directed shoulders are formed on the bars within the grooves.

STILL ANOTHER EXAMPLE, U.S. Pat. No. 3,246,918 to Burghart teaches a joint for joining ends of separate air ducts. The joint comprises a first supported air duct having top and bottom walls with end edges, a second air duct having top and bottom walls with unsupported ends, first cleat means joining the end of the second duct top wall to the end of the first duct top wall, and second cleat means joining the end of the second duct bottom wall to the end of the first duct bottom wall. Each of the cleat means is a reversible cleat and comprises a first generally planar sheet-like cleat section having first and second surfaces and first and second edges, a second generally planar sheet-like cleat section having first and second surfaces and first and second edges, the second section being generally parallel to the first section and having its first surface closely facing the second surface of the first section, a third generally planar sheet-like cleat section having first and second edges, the third section being generally parallel to the first and second sections and having a surface closely facing the second surface of the second section, a first integral sheet portion defining an outwardly projecting integral rib along the first edge of the first section generally perpendicular to the first section, a double thickness integral sheet portion comprising an outwardly projecting integral extension of the first section from along the second edge of the first section, the extension being folded over upon itself and extending downwardly to a position below the second edge of the first section and enclosing the second edge of the first section and merging with the second edge of the second section, the extension being generally perpendicular to the first section, the rib and extension being spaced from each other, generally parallel to each other, and defining an inverted channel together with the first clear section, and a joining portion joining the first edge of the second cleat section with the first edge of the third cleat section, the joining portion comprising an integral sheet portion extending in an arc of about 180 degrees to define a fold merging with the first edge of the second and third cleat sections, the first and second and the second and third cleat sections closely face each other to tightly receive the wall ends of opposite ones of the ducts, the first edge of the first section and the first edge of the second section comprising a pair of lips defining a first elongated slit like opening for insertion of the end wall of a duct, the second edge of the second section and a second edge of the third section comprising of pair of lips defining a second elongated slit like opening, the top wall of the first duct having its end portion within the second opening and tightly between the second and third planar sections of the first cleat means, the top wall of the second duct having its end portion overlying the end portion of the first duct top wall and received within the first opening and tightly between the first and second planar sections of the first cleat means, the first duct having its bottom wall end within the first opening and tightly held between the first and second planar sections of the second cleat means and the second duct having its bottom wall end portion overlying and overlapping the first duct bottom wall end portion and received within the second opening and tightly between the second and third planar sections of the second cleat means, and means impaling each of the cleats and the wall ends received thereby and holding the cleat sections with the wall ends tightly sandwiched therebetween.

YET ANOTHER EXAMPLE, U.S. Pat. No. 3,415,543 to Keating teaches a coupling frame including a hollow channel which overlies duct or wall sections to be joined and a pair of reversely folded legs which define opposed wall receiving channels. In the preferred embodiment, the frame is rectangular and defines a chamber which overlies the junction of the duct or wall sections.

STILL YET ANOTHER EXAMPLE, U.S. Pat. No. 4,558,892 to Daw et al. teaches a duct assembly system for joining duct sections, each having a plurality of flat intersecting walls which includes angle member connectors respectively associated with the duct walls. Each connector is generally L-shaped with one leg portion extending perpendicular to the duct wall and having an elongated channel formed therein and the other leg portion comprising two biased-together flanges adapted for frictionally receiving the adjacent duct wall edge therebetween. Each flange has elongated ridges which interlock with elongated ribs on the associated duct wall. Each duct wall edge is embedded in a mastic sealant in a trough in the associated connector. The trough has diverging sides for guiding the duct wall edge thereinto. Connectors on intersecting duct walls are joined by corner members formed of sheet metal and flanged for rigidity and tight fit in the connector channels. Each corner member has flanges for gripping the channel edges of the joined connectors. Adjacent corner members on the two duct sections are joined by fasteners and a gasket may be disposed between the duct sections.

YET STILL ANOTHER EXAMPLE, U.S. Pat. No. 4,941,693 to Spaude et al. teaches a connector for connecting end-to-end two spiral-wound sheet metal air ducts. The connector is an annular structure with opposite end segments, each of which presents an annular recess or groove which is open at its outer end and closed at its inner end and filled with sealing mastic. The dimension of each recess or groove transverse to the longitudinal axis of the ducts and the connector is substantially equal to the maximum thickness of the corresponding duct (i.e., where its spiral rib is located), so that each duct has a snug sliding fit in the corresponding recess.

STILL YET ANOTHER EXAMPLE, U.S. Pat. No. 5,195,789 to Walsh et al. teaches a slip lock connector assembly for joining end-to-end first and second flat-sided ducts made of sheet metal and has a frame like structure defined by a plurality of similar connecting members arranged in coplanar array. Each connecting member is made of pliable sheet metal bent, rolled, and molded to proper form. Each member has a flat main wall with first and second walls at opposite sides defining first and second channels. Both channels are filled with sealant material. The flat end of a side of the first duct in slipped into the first channel and secured by auxiliary fastening elements, whereby the sealant in the first channel seals the connector to the flat end of the first duct. The flat end of a side of the second duct is slipped into the second channel and sealed by the sealant therein. In addition, the wall of the second channel is formed with a rolled ledge which engages with lock projections on a side of the second duct to secure the second duct to the second channel. The second channel may have a laterally extending flange to stiffen the structure of the connecting member.

It has been found that by orienting the folded free edge of the flange toward the ledge, the space above the drill rail that the chuck of the tool that drives the screw into the drill rail must occupy is obstructed and thereby eliminating the clearance needed for the chuck of the tool.

YET STILL ANOTHER EXAMPLE, U.K. Patent Number 1,458,912 to Kelver teaches two ducts having substantially similar quadrangular cross sectional shapes and positioned in an end-to-end relationship. Each duct has an outer wall and a liner overlying the inner surface of the outer wall, the liner of each duct terminating in an end, the outer wall of each duct having an end portion extending beyond the end of its overlying liner, and a clip positioned between the ducts, the clip being elongate and comprising an outer fold extending longitudinally of the clip and joined at one longitudinal edge to one longitudinal edge of the outer fold and bent thereover to form a channel between the outer and middle folds, an inner fold extending longitudinally of the clip and joined at one longitudinal edge to the opposite longitudinal edge of the middle fold and bent thereover to form a channel between the inner and middle folds, a leg extending longitudinally of the clip and projecting substantially perpendicularly from the inner fold between the one longitudinal edge and the opposite longitudinal edge of the inner fold, the leg terminating in a flange spaced overlying the inner fold, the end portion of the outer wall of one duct being positioned in the channel between the outer and middle folds, the end portion of the outer wall of the other duct being positioned in the channel between the inner and middle folds, and the end of the liner of one of the ducts being fitted under the flange and over a portion of the inner fold.

It is apparent that numerous innovations for duct work connectors have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a connector for joining two pieces of sheet metal together end-to-end and the two pieces of sheet metal that avoids the disadvantages of the prior art.

ANOTHER OBJECT of the present invention is to provide a connector for joining two pieces of sheet metal together end-to-end and the two pieces of sheet metal that is simple to use.

BRIEFLY STATED, STILL ANOTHER OBJECT of the present invention is to provide a connector for joining two pieces of sheet metal together end-to-end. A second wall and a first wall define a first channel therebetween, into which a ledge extends, and which lockingly receives one piece of sheet metal by virtue of at least one reverse button lock projection on a raw free end of the one piece of sheet metal snapingly engaging against the ledge. A third wall terminates in a free edge that is folded onto itself, and together with the first wall defines a second channel therebetween that lockingly receives the other piece of sheet metal by virtue of at least one reverse button lock projection on a raw free end of the other piece of sheet metal snapingly engaging against the folded free edge of the third wall.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

The figures of the drawing are briefly described as follows.

Figure 1:
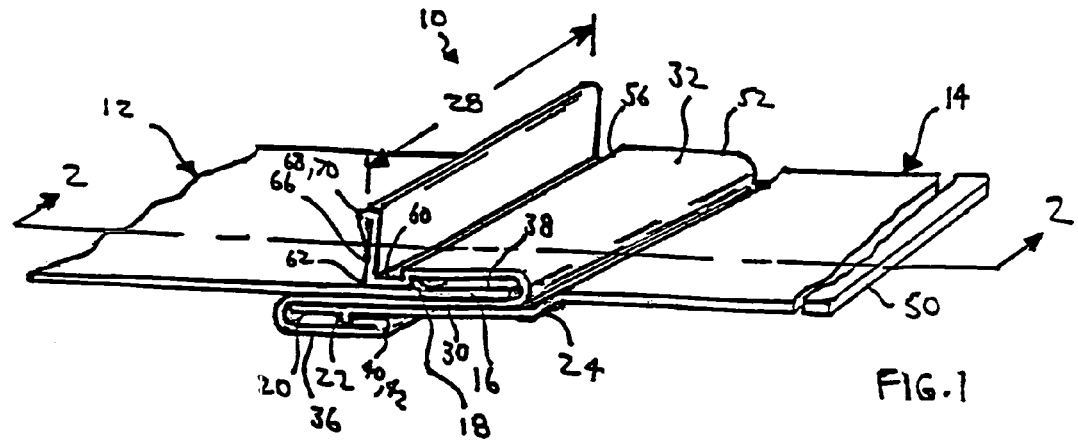
FIG. 1 is a diagrammatic perspective view of the connector of the present invention joining two pieces of sheet metal of the present invention together end-to-end.
Figure 2:
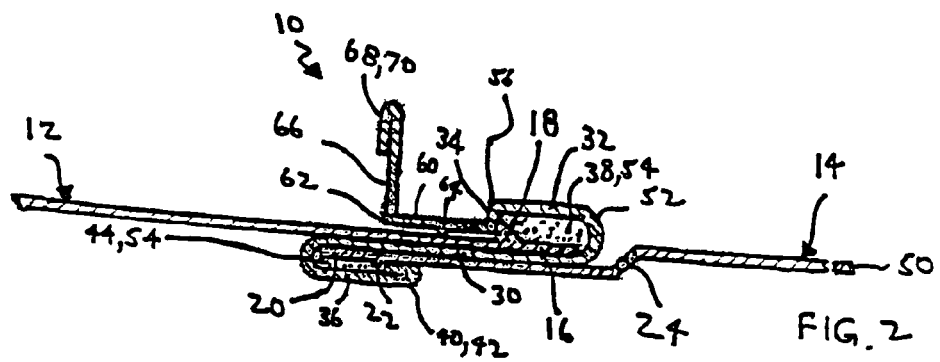
FIG. 2 is a diagrammatic cross sectional view taken along LINE 2—2 in FIG. 1.

LIST OF REFERENCE NUMERALS UTILIZED IN THE DRAWINGS 10 connector of present invention for joining first piece of sheet metal 12 and second piece of sheet metal 14 together end-to-end
12 first piece of sheet metal
14 second piece of sheet metal
16 raw free end of first piece of sheet metal 12
18 at least one wedge-shaped reverse button lock projection on raw free end 16 of first piece of sheet metal 12
20 raw free end of second piece of sheet metal 14
22 at least one wedge-shaped reverse button lock projection on raw free end 20 of second piece of sheet metal 14
24 joggle on raw free end 20 of second piece of sheet metal 14, inward of at least one wedge-shaped reverse button lock projection 22 on raw free end 20 of second piece of sheet metal 14
26 longitudinal center line of connector 10
28 length of connector 10
30 first wall
32 second wall
34 ledge
36 third wall
38 first channel defined by first wall 30 and second wall 32
40 free edge of third wall 36
42 folded free edge of free edge 40 of third wall 36
44 second channel defined by first wall 30 and third wall 36
46 lateral opening of first channel 38
48 lateral opening of second channel 44
50 other raw free end of second piece of sheet metal 14
52 one continuous piece of pliable sheet metal
54 adhesive sealing compound material
56 terminal edge of second wall 32
58 terminal edge of ledge 34
60 fourth wall
62 terminal edge of fourth wall 60
64 drill rail of fourth wall
66 flange
68 free edge of flange 66
70 folded free edge of free edge 68 of flange 66
110 first alternate embodiment of connector of present invention
210 second alternate embodiment of connector of present invention

DETAILED DESCRIPTION OF THE INVENTION

Figure 3:
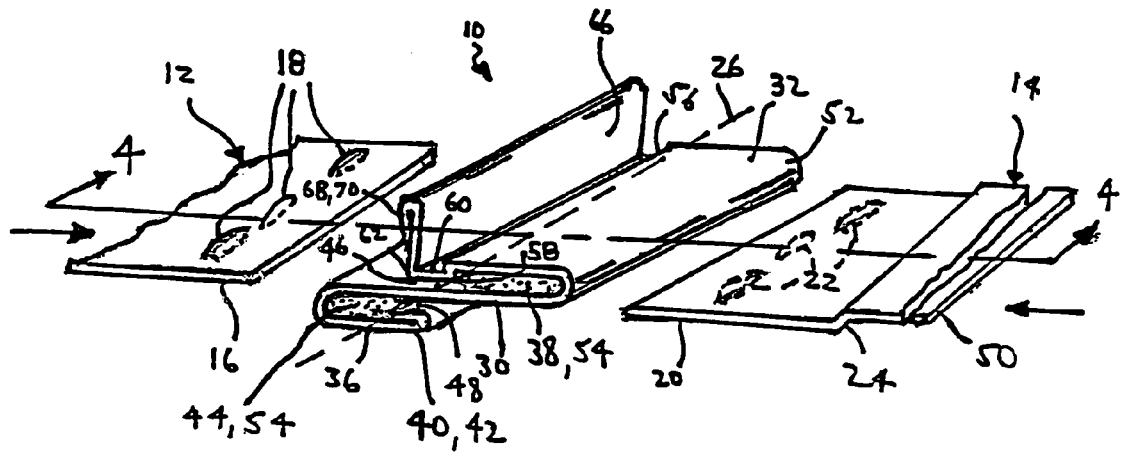
FIG. 3 is an exploded diagrammatic perspective view of the connector of the present invention joining two pieces of sheet metal of the present invention together end-to-end shown in FIG. 1.
Figure 4:
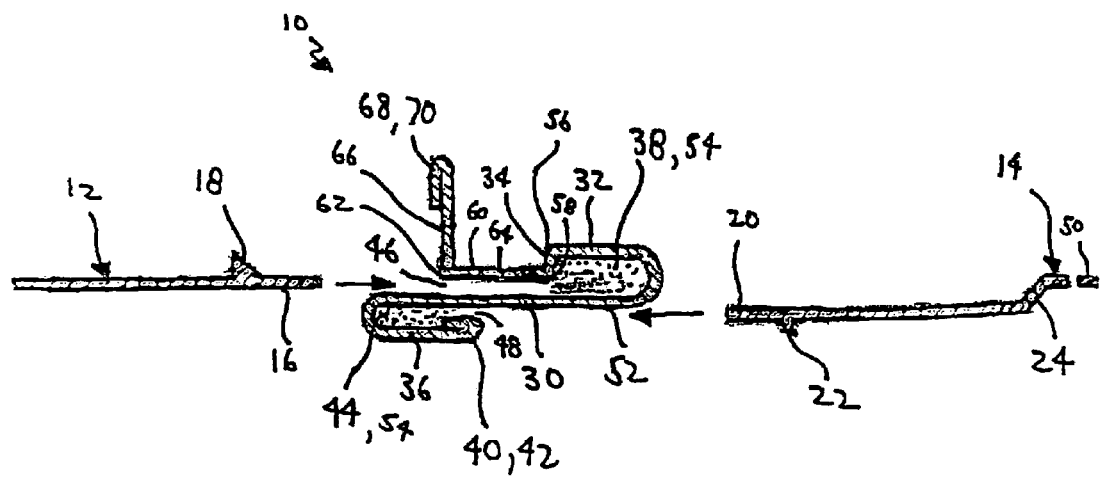
FIG. 4 is a diagrammatic cross sectional view taken along LINE 4—4 in FIG. 3.

Referring now to the figures, in which like numerals indicate like parts, and particularly to FIGS. 1–4, which are, respectively, a diagrammatic perspective view of the connector of the present invention joining two pieces of sheet metal of the present invention together end-to-end, a diagrammatic cross sectional view taken along LINE 2—2 in FIG. 1, an exploded diagrammatic perspective view of the connector of the present invention joining two pieces of sheet metal of the present invention together end-to-end shown in FIG. 1, and a diagrammatic cross sectional view taken along LINE 4—4 in FIG. 3, the connector of the present invention is shown generally at 10 for joining a first piece of sheet metal 12 and a second piece of sheet metal 14 together end-to-end. The first piece of sheet metal 12 has a raw free end 16 with at least one wedge-shaped reverse button lock projection 18 thereon, while the second piece of sheet metal 14 has a raw free end 20 with at least one wedge-shaped reverse button lock projection 22 thereon and a joggle 24 inward of the at least one wedge-shaped reverse button lock projection 22 thereon.

The connector 10 has a longitudinal center line 26 and a length 28 and comprises a first wall 30, a second wall 32, a ledge 34, and a third wall 36. The first wall 30 is flat and extends the length 28 of the connector 10. The second wall 32 is flat, extends the length 28 of the connector 10, is parallel to the first wall 30, and defines with the first wall 30 a first channel 38 therebetween. The ledge 34 extends the length 28 of the connector 10 and inwardly from the second wall 32, into the first channel 38. The third wall 36 is flat, extends the length 28 of the connector 10, is parallel to the first wall 30, terminates in a free edge 40 that is folded inwardly onto itself so as to form a folded free edge 42, and defines with the first wall 30 a second channel 44 therebetween.

The first channel 38 opens laterally so as to form a lateral opening 46 that lockingly receives the raw free end 16 of the first piece of sheet metal 12, by virtue of the at least one wedge-shaped reverse button lock projection 18 on the raw free end 16 of the first piece of sheet metal 12 spreading the second wall 32 away from the first wall 30 as the raw free end 16 of the first piece of sheet metal 12 slips through the first channel 38 until such time as the at least one wedge-shaped reverse button lock projection 18 on the raw free end 16 of the first piece of sheet metal 12 just clears the ledge 34 causing the second wall 32 to unspread, and in so doing, causes the at least one wedge-shaped reverse button lock projection 18 on the raw free end 16 of the first piece of sheet metal 12 to be snapingly engaged onto, and lockingly captured against, the ledge 34, and in so doing, the first piece of sheet metal 12 is secured in the connector 10.

The second channel 44 opens laterally so as to form a lateral opening 48 that lockingly receives the raw free end 20 of the second piece of sheet metal 14, by virtue of the at least one wedge-shaped reverse button lock projection 22 on the raw free end 20 of the second piece of sheet metal 14 spreading the third wall 36 away from the first wall 30 as the second piece of sheet metal 14 slips through the second channel 44 until such time as the at least one wedge-shaped reverse button lock projection 22 on the raw free end 20 of the second piece of sheet metal 14 just clears the folded free edge 42 of the third wall 36 causing the third wall 36 to unspread, and in so doing, causes the at least wedge-shaped reverse button lock projection 22 on the raw free end 20 of the second piece of sheet metal 14 to be snapingly engaged onto, and lockingly captured against, the folded free edge 42 of the third wall 36, and in so doing, the second piece of sheet metal 14 is secured in the connector 10.

The first channel 38 and the second channel 44 open in opposite directions from each other so as to join the first piece of sheet metal 12 and the second piece of sheet metal 14 together end-to-end, and are offset relative to each other, and as a result thereof, requires the joggle 24 on the raw free end 20 of the second piece of sheet metal 14 to offset the second piece of sheet metal 14 so as to allow insertion of the other raw free end 50 of the second piece of sheet metal 14 into the first channel 38 of a next connector 10 without a need for field dressing.

The connector 10 is made from one continuous piece of pliable sheet metal 52. The one continuous piece of pliable sheet metal 52 is galvanized sheet steel to combat corrosion, is bent, rolled, and molded to form the connector 10, and has a thickness that ranges from eighteen to twenty-four gauge. Alternatively, the connector 10 is made from extruded plastic.

The connector 10 further comprises adhesive sealing compound material 54 that is highly viscous, such as that manufactured by Duro-Dyne and known as Ducklock Sealant type DLS. The adhesive sealing compound material 54 fills, and adheres to, the first channel 38 and adheres to the raw free end 16 of the first piece of sheet metal 12 so as to seal the raw free end 16 of the first piece of sheet metal 12 in the first channel 38 against leakage of a material flowing along the first piece of sheet metal 12. The adhesive sealing compound material 54 further fills, and adheres to, the second channel 44 and adheres to the raw free end 20 of the second piece of sheet metal 14 so as to seal the raw free end 20 of the second piece of sheet metal 14 in the second channel 44 against leakage of a material flowing along the second piece of sheet metal 14.

The second wall 32 is one-piece with the first wall 30, is bent from one longitudinal edge of the first wall 30 to fold thereover in a direction towards the other longitudinal edge of the first wall 30, is slightly spaced from one side of the first wall 30 so as to allow the first channel 38 to be narrow, and terminates in a terminal edge 56. The terminal edge 56 of the second wall 32 is disposed in close proximity to, and to one side of, the longitudinal center line 26 of the connector 10. The ledge 34 extends perpendicularly inwardly from the terminal edge 56 of the second wall 32 to a terminal edge 58 which is slightly spaced from the first wall 30.

The third wall 36 is one-piece with the first wall 30, is bent from the other longitudinal edge of the first wall 30 to fold thereunder in a direction towards the one longitudinal edge of the first wall 30, and is slightly spaced from the other side of the first wall 30 so as to allow the second channel 44 to be narrow. The folded free edge 42 of the third wall 36 is disposed in close proximity to, and to the other side of, the longitudinal center line 26 of the connector 10.

The connector 10 further comprises a fourth wall 60. The fourth wall 60 is flat, parallel to the first wall 30, the second wall 32, and the third wall 36, and extends from the terminal edge 58 of the ledge 34 to a terminal edge 62 which is disposed in substantial alignment with the folded free edge 42 of the third wall 36.

The fourth wall 60 has a drill rail 64. The drill rail 64 of the fourth wall 60 extends the length 28 of the connector 10 and prevents a self-tapping sheet metal screw (not shown) being screwed into the fourth wall 60 from skipping thereacross. The self-tapping sheet metal screw (not shown) is screwed into the fourth wall 60, the first piece of sheet metal 12, the first wall 30, the second piece of sheet metal 14, and the third wall 36 if required in order to comply to a local building code.

The connector 10 further comprises a flange 66. The flange 66 structurally stiffens the connector 10, is flat, and extends outwardly from the terminal edge 62 of the fourth wall 60, in a direction away from the first wall 30, the second wall 32, and the third wall 36, to a free edge 68. The free edge 68 of the flange 66 is folded onto itself in a direction away from the ledge 34 so as to form a folded free edge 70 that further structurally stiffens the connector 10 while eliminating a sharp edge. The flange 66 has a height that is directly proportional to the length 28 of the connector 10, and is in a range of approximately ⅜ inches to approximately 1⅜ inches.

It has been found that by orienting the folded free edge 68 of the flange 66 away from the ledge 34, the space above the drill rail 64 that the chuck of the tool that drives the screw into the drill rail 64 must occupy is not obstructed and thereby providing the clearance needed for the chuck of the tool.

Figure 4A:
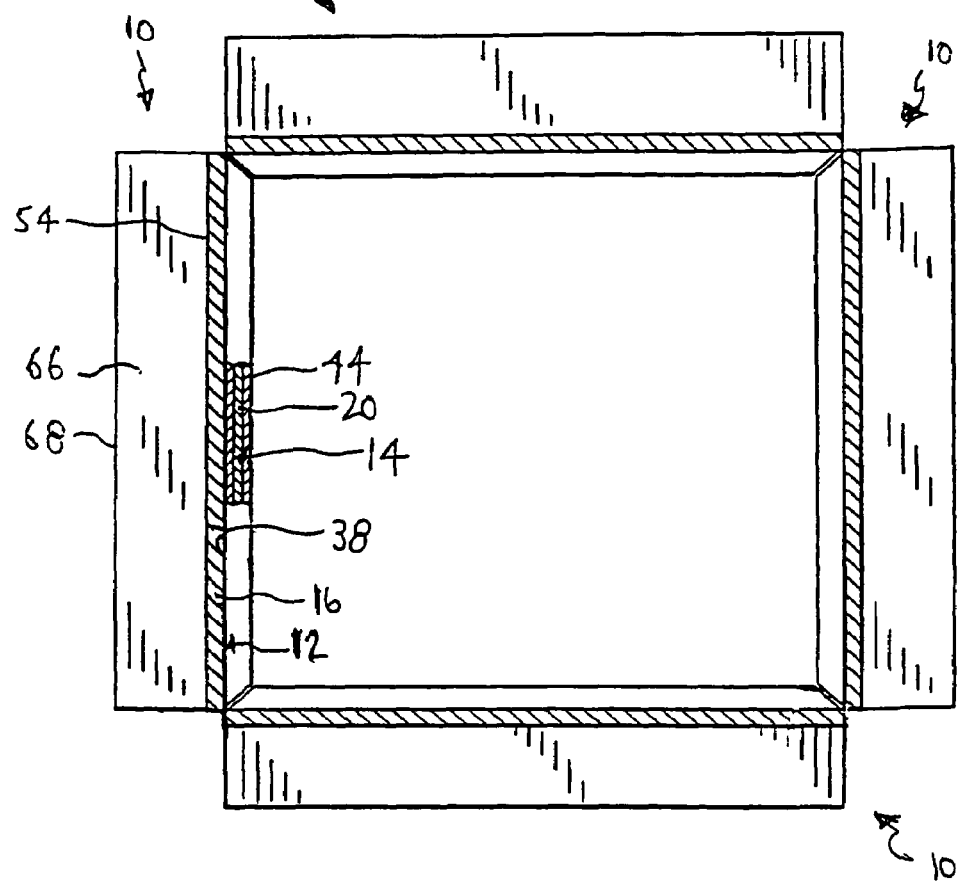
FIG. 4A is a diagrammatic front elevational view of a connector assembly embodying the invention, shown installed on a first duct, with portions of a second duct also shown attached to the connector assembly.

As shown in FIG. 4A, which is a diagrammatic front elevational view of a connector assembly embodying the invention shown installed on a first duct, with portions of a second duct also shown attached to the connector assembly, four connectors 10 are disposed at right angles to each other in a coplanar array to define a four-sided frame-like structure for joining the first piece of sheet metal 12 and the second piece of sheet metal 12 together end-to-end when each of the first piece of sheet metal 12 and the second piece of sheet metal 14 is a four-sided duct.

FIG. 4A is illustrative of how four of the connectors 10 can be used to join a pair of four-sided ducts together end-to-end. It is to be understood, however, that any number sided ducts can be joined together end-to-end by merely utilizing a corresponding number of the connectors 10, wherein a connector 10 is utilized for each side.

Figure 5:
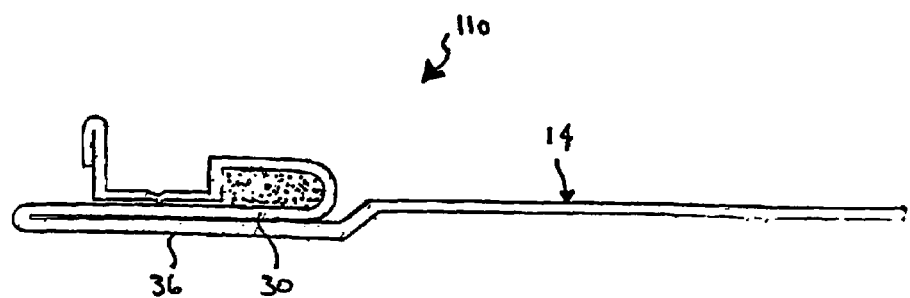
FIG. 5 is a diagrammatic end view of a first alternate embodiment of the connector of the present invention wherein the second piece of sheet metal is formed as one-piece with the connector.

A first alternate embodiment of the connector 110 of the present invention can best be seen in FIG. 5, which is a diagrammatic end view of a first alternate embodiment of the connector of the present invention wherein the second piece of sheet metal is formed as one-piece with the connector, and as such, will be discussed with reference thereto.

The connector 110 is similar to the connector 10, except that the second channel 44 is eliminated, and as a result thereof, the third wall 36 abuts directly against the other side of the first wall 30. Additionally, the folded free edge 42 of the third wall 36 is eliminated, and the free edge 40 of the third wall 36 is not free, but rather extends as the second piece of sheet metal 14.

Figure 6:
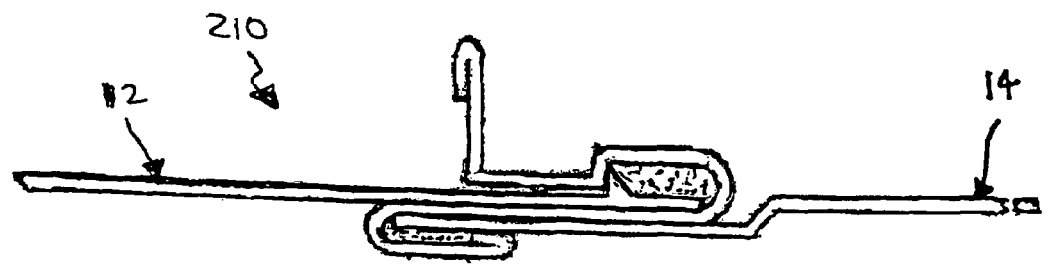
FIG. 6 is a diagrammatic end view of a second alternate embodiment of the connector of the present invention wherein the second piece of sheet metal does not have the reverse button locks thereon.

A second embodiment of the connection 210 of the present invention can best be seen in FIG. 6, which is a diagrammatic end view of a second alternate embodiment of the connector of the present invention wherein the second piece of sheet metal does not have the reverse button locks thereon, and as such, will be discussed with reference thereto.

The connector 210 is similar to the connector 10, except that the at least one wedge-shaped reverse button lock projection 22 on the raw free end 20 of the second piece of sheet metal 14 is eliminated.

It will be understood that each of the elements described above, or two or more together, may also find a useful application in other types of constructions differing from the types described above.

While the invention has been illustrated and described as embodied in a connector for joining two pieces of sheet metal together end-to-end and the two pieces of sheet metal, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A connector for joining a first piece of sheet metal and a second piece of sheet metal together end-to-end, wherein said connector has a length and a longitudinal center line, wherein the first piece of sheet metal has a raw free end with at least one wedge-shaped reverse button lock projection thereon, and wherein the second piece of sheet metal has a raw free end with at least one wedge-shaped reverse button lock projection thereon and a joggle inward of the at least one wedge-shaped reverse button lock projection thereon, said connector comprising:
 a) a first wall;
 b) a second wall;
 c) a ledge;
 d) a third wall;
 e) a fourth wall; and
 f) a flange;
 wherein said second wall and said first wall define a first channel therebetween;
 wherein said ledge extends inwardly from said second wall;
 wherein said ledge extends into said first channel;
 wherein said first channel is for lockingly receiving the raw free end of the first piece of sheet metal by virtue of the at least one wedge-shaped reverse button lock projection on the raw free end of the first piece of sheet metal spreading said second wall away from said first wall as the raw free end of the first piece of sheet metal slips through said first channel until such time as the at least one wedge-shaped reverse button lock projection on the raw free end of the first piece of sheet metal just clears said ledge causing said second wall to unspread, and in so doing, causes the at least one wedge-shaped reverse button lock projection on the raw free end of the first piece of sheet metal to be snapingly engaged onto, and lockingly captured against, said ledge, and in so doing, the first piece of sheet metal is secured in said connector;
 wherein said third wall terminates in a free edge;
 wherein said free edge of said third wall is folded inwardly onto itself so as to form a folded free edge;
 wherein said third wall and said first wall define a second channel therebetween;
 wherein said second channel is for lockingly receiving the raw free end of the second piece of sheet metal by virtue of the at least one wedge-shaped reverse button lock projection on the raw free end of the second piece of sheet metal spreading said third wall away from said first wall as the second piece of sheet metal slips through said second channel until such time as the at least one wedge-shaped reverse button lock projection on the raw free end of the second piece of sheet metal just clears said folded free edge of said third wall causing said third wall to unspread, and in so doing, causes the at least wedge-shaped reverse button lock projection on the raw free end of the second piece of sheet metal to be snapingly engaged onto, and lockingly captured against, said folded free edge of said third wall, and in so doing, the second piece of sheet metal is secured in said connector;
 wherein said first channel and said second channel open in opposite directions from each other for joining the first piece of sheet metal and the second piece of sheet metal together end-to-end;
 wherein said first channel and said second channel are offset relative to each other, and as a result thereof, requires the joggle on the raw free end of the second piece of sheet metal to offset the second piece of sheet metal so as to allow insertion of the other raw free end of the second piece of sheet metal into said first channel of a next connector without a need for field dressing;
 wherein said fourth wall extends from said ledge to a terminal edge;
 wherein said flange extends outwardly from said fourth wall;
 wherein said flange structurally stiffens said connector;
 wherein said flange has a free edge; and
 wherein said free edge of said flange is folded onto itself in a direction away from said ledge so as to form a folded free edge.

2. The connector as defined in claim 1, wherein said connector is made from one continuous piece of pliable sheet metal; and
 wherein said one continuous piece of pliable sheet metal is bent, rolled, and molded to form said connector.

3. The connector as defined in claim 2, wherein said one continuous piece of pliable sheet metal has a thickness; and
 wherein said thickness of said one continuous piece of sheet metal ranges from eighteen to twenty-four gauge.

4. The connector as defined in claim 2, wherein said one continuous piece of pliable sheet metal is galvanized sheet steel to combat corrosion.

5. The connector as defined in claim 1, wherein said connector is made from extruded plastic.

6. The connector as defined in claim 1, further comprising an adhesive sealing compound;
 wherein said adhesive sealing compound material is highly viscous;
 wherein said adhesive sealing compound material fills said first channel;
 wherein said adhesive sealing compound material adheres to said first channel;
 wherein said adhesive sealing compound material is for adhering to the raw free end of the first piece of sheet metal;
 wherein said adhesive sealing compound material is for sealing the raw free end of the first piece of sheet metal in said first channel against leakage of a material flowing along the first piece of sheet metal;
 wherein said adhesive sealing compound material fills said second channel;
 wherein said adhesive sealing compound material adheres to said second channel;
 wherein said adhesive sealing compound material is for adhering to the raw free end of the second piece of sheet metal; and
 wherein said adhesive sealing compound material is for sealing the raw free end of the second piece of sheet metal in said second channel against leakage of a material flowing along the second piece of sheet metal.

7. The connector as defined in claim 1, wherein said first wall is flat;
 wherein said second wall is flat; and
 wherein said third wall is flat.

8. The connector as defined in claim 1, wherein said second wall is parallel to said first wall; and
 wherein said third wall is parallel to said first wall.

9. The connector as defined in claim 1, wherein said second wall is slightly spaced from one side of said first wall so as to allow said first channel to be narrow; and
   wherein said third wall is slightly spaced from the other side of said first wall so as to allow said second channel to be narrow.

10. The connector as defined in claim 1, wherein said second wall is one-piece with said first wall;
    wherein said second wall is bent from one longitudinal edge of said first wall to fold thereover in a direction towards the other longitudinal edge of said first wall;
    wherein said third wall is one-piece with said first wall; and
    wherein said third wall is bent from the other longitudinal edge of said first wall to fold thereunder in a direction towards said one longitudinal edge of said first wall.

11. The connector as defined in claim 1, wherein said first channel opens laterally so as to form a lateral opening;
    wherein said lateral opening of said first channel is for receiving the raw free end of the first piece of sheet metal;
    wherein said second channel opens laterally so as to form a lateral opening; and
    wherein said lateral opening of said second channel is for receiving the raw free end of the second piece of sheet metal.

12. The connector as defined in claim 1, wherein said second wall terminates in a terminal edge;
    wherein said terminal edge of said second wall is disposed in close proximity to said longitudinal center line of said connector;
    wherein said terminal edge of said second wall is disposed to one side of said longitudinal center line of said connector;
    wherein said folded free edge of said third wall is disposed in close proximity to said longitudinal center line of said connector;
    wherein said folded free edge of said third wall is disposed to the other side of said longitudinal center line of said connector;
    wherein said ledge extends perpendicularly from said second wall;
    wherein said ledge extends inwardly from said terminal edge of said second wall to a terminal edge;
    wherein said terminal edge of said ledge is slightly spaced from said first wall;
    wherein said fourth wall extends from said terminal edge of said ledge to a terminal edge; and
    wherein said terminal edge of said fourth wall is disposed in substantial alignment with said folded free edge of said third wall.

13. The connector as defined in claim 1, wherein said fourth wall is flat;
    wherein said fourth wall is parallel to said first wall;
    wherein said fourth wall is parallel to said second wall; and
    wherein said fourth wall is parallel to said third wall.

14. The connector as defined in claim 1, wherein said fourth wall has a drill rail;
    wherein said drill rail extends said length of said connector;
    wherein said drill rail is for preventing a self-tapping sheet metal screw being screwed into said fourth wall from skipping thereacross; and
    wherein said self-tapping sheet metal screw is for screwing into said fourth wall, the first piece of sheet metal, said first wall, the second piece of sheet metal, and said third wall if required in order to comply to a local building code.

15. The connector as defined in claim 12, wherein said flange is flat.
    wherein said flange extends outwardly from said terminal edge of said fourth wall to a free edge;
    wherein said flange extends in a direction away from said first wall;
    wherein said flange extends in a direction away from said second wall;
    wherein said flange extends in a direction away from said third wall;
    wherein said folded free edge of said flange further structurally stiffens said connector; and
    wherein said folded free edge of said flange is for eliminating a sharp edge.

16. The connector as defined in claim 1, wherein said first wall extends said length of said connector;
    wherein said second wall extends said length of said connector;
    wherein said third wall extends said length of said connector;
    wherein said ledge extends said length of said connector;
    wherein said fourth wall extends said length of said connector; and
    wherein said flange extends said length of said connector.

17. The connector as defined in claim 1, wherein said flange has a height; and
    wherein said height of said flange is directly proportional to said length of said connector.

18. The connector as defined in claim 17, wherein said height of said flange is in a range of approximately ⅜ inches to approximately 1⅜ inches.

19. Two pieces of sheet metal for being joined together end-to-end by a connector, wherein the connector has a first wall, a second wall, a ledge, a third wall, a fourth wall, and a flange, wherein the second wall of the connector and the first wall of the connector define a first channel therebetween, wherein the ledge of the connector extends inwardly from the second wall of the connector, into the first channel of the connector, wherein the third wall of the connector terminates in a free edge, wherein the free edge of the third wall of the connector is folded inwardly onto itself so as to form a folded free edge, wherein the third wall of the connector and the first wall of the connector define a second channel therebetween, wherein the first channel of the connector and the second channel of the connector open in opposite directions from each other, wherein the first channel of the connector and the second channel of the connector are offset relative to each other, wherein said fourth wall extends from said ledge to a terminal edge, wherein said flange extends outwardly from said fourth wall, wherein said flange structurally stiffens said connector, wherein said flange has a free edge, and wherein said free edge of said flange is folded onto itself in a direction away from said ledge so as to form a folded free edge, said two pieces of sheet metal comprising:
    a) a first piece of sheet metal; and
    b) a second piece of sheet metal;
    wherein said first piece of sheet metal has a raw free end;
    wherein said raw free end of said first piece of sheet metal has at least one wedge-shaped reverse button lock projection thereon;
    wherein said second piece of sheet metal has a raw free end;

wherein said raw free end of said second piece of sheet metal has at least one wedge-shaped reverse button lock projection thereon;

wherein said raw free end of said second piece of sheet metal has a joggle;

wherein said joggle is inward of said at least one wedge-shaped reverse button lock projection on said raw free end of said second piece of sheet metal;

wherein said joggle on said raw free end of said second piece of sheet metal offsets said second piece of sheet metal for allowing insertion of the other raw free end of said second piece of sheet metal into the first channel of a next connector without a need for field dressing;

wherein said raw free end of said first piece of sheet metal is for being lockingly received in the first channel of the connector by virtue of said at least one wedge-shaped reverse button lock projection on said raw free end of said first piece of sheet metal spreading the second wall of the connector away from the first wall of the connector as said raw free end of said first piece of sheet metal slips through the first channel of the connector until such time as said at least one wedge-shaped reverse button lock projection on said raw free end of said first piece of sheet metal just clears the ledge of the connector causing the second wall of the connector to unspread, and in so doing, causes said at least one wedge-shaped reverse button lock projection on said raw free end of said first piece of sheet metal to be snapingly engaged onto, and lockingly captured against, the ledge of the connector, and in so doing, said first piece of sheet metal is secured in the connector;

wherein said raw free end of said second piece of sheet metal is for being lockingly received in the second channel of the connector by virtue of said at least one wedge-shaped reverse button lock projection on said raw free end of said second piece of sheet metal spreading the third wall of the connector away from the first wall of the connector as said second piece of metal slips through the second channel of the connector until such time as said at least one wedge-shaped reverse button lock projection on said raw free end of said second piece of sheet metal just clears the folded free edge of the third wall of the connector causing the third wall of the connector to unspread, and in so doing, causes said at least wedge-shaped reverse button lock projection on said raw free end of said second piece of sheet metal to be snapingly engaged onto, and lockingly captured against, the folded free edge of the third wall of the connector, and in so doing, said second piece of sheet metal is secured in the connector.

20. A connector for securely receiving a piece of sheet metal, wherein the piece of sheet metal has a raw free end with at least one wedge-shaped reverse button lock projection thereon, said connector comprising:
a) a first wall;
b) a second wall;
c) a ledge;
d) a third wall;
e) a fourth wall; and
f) a flange;
wherein said second wall and said first wall define a channel therebetween;
wherein said ledge extends inwardly from said second wall;
wherein said ledge extends into said channel;
wherein said channel is for lockingly receiving the raw free end of the piece of sheet metal by virtue of the at least one wedge-shaped reverse button lock projection on the raw free end of the piece of sheet metal spreading said second wall away from said first wall as the raw free end of the piece of sheet metal slips through said channel until such time as the at least one wedge-shaped reverse button lock projection on the raw free end of the piece of sheet metal just clears said ledge causing said second wall to unspread, and in so doing, causes the at least one wedge-shaped reverse button lock projection on the raw free end of the piece of sheet metal to be snapingly engaged onto, and lockingly captured against, said ledge, and in so doing, the piece of sheet metal is secured in said connector;

wherein said third wall has a raw free end;

wherein said raw free end of said third wall is for insertion into said channel of a next connector;

wherein said third wall has a joggle thereon;

wherein said joggle is inward of said raw free end of said third wall;

wherein said joggle on said third wall offsets said third wall so as to allow insertion of said raw free end of said third wall into said channel of said next connector without a need for field dressing;

wherein said fourth wall extends from said ledge to a terminal edge;

wherein said flange extends outwardly from said fourth wall;

wherein said flange structurally stiffens said connector;

wherein said flange has a free edge; and wherein said free edge of said flange is folded onto itself in a direction away from said ledge so as to form a folded free edge.

21. A connector for joining a first piece of sheet metal and a second piece of sheet metal together end-to-end, wherein said connector has a length and a longitudinal center line, wherein the first piece of sheet metal has a raw free end with at least one wedge-shaped reverse button lock projection thereon, and wherein the second piece of sheet metal has a joggle thereon, said connector comprising:
a) a first wall;
b) a second wall;
c) a ledge;
d) a third wall;
e) a fourth wall; and
f) a flange;
wherein said second wall and said first wall define a first channel therebetween;
wherein said ledge extends inwardly from said second wall;
wherein said ledge extends into said first channel;
wherein said first channel is for lockingly receiving the raw free end of the first piece of sheet metal by virtue of the at least one wedge-shaped reverse button lock projection on the raw free end of the first piece of sheet metal spreading said second wall away from said first wall as the raw free end of the first piece of sheet metal slips through said first channel until such time as the at least one wedge-shaped reverse button lock projection on the raw free end of the first piece of sheet metal just clears said ledge causing said second wall to unspread, and in so doing, causes the at least one wedge-shaped reverse button lock projection on the raw free end of the first piece of sheet metal to be snapingly engaged onto, and lockingly captured against, said ledge, and in so doing, the first piece of sheet metal is secured in said connector;

wherein said third wall terminates in a free edge;

wherein said free edge of said third wall is folded inwardly onto itself so as to form a folded free edge;

wherein said third wall and said first wall define a second channel therebetween;

wherein said second channel is for lockingly receiving the raw free end of the second piece of sheet metal;

wherein said first channel and said second channel open in opposite directions from each other for joining the first piece of sheet metal and the second piece of sheet metal together end-to-end;

wherein said first channel and said second channel are offset relative to each other, and as a result thereof, requires the joggle on the raw free end of the second piece of sheet metal to offset the second piece of sheet metal so as to allow insertion of the other raw free end of the second piece of sheet metal into said first channel of a next connector without a need for field dressing;

wherein said fourth wall extends from said ledge to a terminal edge;

wherein said flange extends outwardly from said fourth wall;

wherein said flange structurally stiffens said connector;

wherein said flange has a free edge; and wherein said free edge of said flange is folded onto itself in a direction away from said ledge so as to form a folded free edge.

* * * * *